Nov. 19, 1963

C. A. CADY 3,111,617

CONTROL APPARATUS FOR CHARGING A STORAGE
BATTERY TO A PREDETERMINED VOLTAGE

Filed Sept. 8, 1959

INVENTOR.
CHARLES A. CADY

BY
KENWAY, JENNEY, WITTER & HILDRETH

ATTORNEYS

Nov. 19, 1963

C. A. CADY 3,111,617

CONTROL APPARATUS FOR CHARGING A STORAGE
BATTERY TO A PREDETERMINED VOLTAGE

Filed Sept. 8, 1959

INVENTOR.
CHARLES A. CADY
BY
KENWAY, JENNEY, WITTER & HILDRETH

ATTORNEYS

United States Patent Office 3,111,617
Patented Nov. 19, 1963

3,111,617
CONTROL APPARATUS FOR CHARGING A STORAGE BATTERY TO A PREDETERMINED VOLTAGE
Charles A. Cady, Shaw Drive, Wayland, Mass.
Filed Sept. 8, 1959, Ser. No. 838,620
9 Claims. (Cl. 320—39)

This invention relates in general to control systems and in particular to control systems for charging a battery.

Many different systems are in use today for re-charging storage batteries. Most of these systems are critically dependent on the operation of electro-mechanical relays and the like which are highly susceptible to injury from shock, vibration, mechanical contact, wear and atmospheric contamination. Additionally, relays frequently display a generally erratic behavior since they are highly sensitive devices which must respond to a slowly changing voltage or current. The exposed contacts which are necessarily found on such relays encourage sparking and preclude their use in hazardous areas. As a result, many presently available battery chargers have proved to be unreliable in operation and have frequently required expensive repair or replacement after relatively limited periods of service.

The control apparatus which comprises the subject matter of this invention employs transistor circuitry to obviate the disadvantages associated with electromechanical switches. The conductivity of a switching transistor, which is connected between the battery charging source and the battery itself, is controlled in accordance with the battery charging requirements. A voltage sensitive device comprising at least one Zener diode, is so connected as to be responsive to the battery voltage during the charging operation and to conduct abruptly when a predetermined battery voltage is reached. A bistable circuit is controlled by the Zener diode so as to change from one bistable state to the other when the diode becomes conductive. The bistable circuit controls the operation of the switching transistor and initiates battery charging whenever the aforesaid change of state occurs.

Accordingly, it is the primary object of this invention to provide control apparatus for battery chargers which overcomes the foregoing disadvantages.

It is another object of this invention to provide control apparatus for battery chargers which is automatic in operation and which may be left unattended for long periods of time.

It is a further object of this invention to provide control apparatus for battery chargers which may be safely used in hazardous areas.

This and other objects of the invention, together with further features and advantages thereof, will become apparent from the following detailed specification in conjunction with the accompanying drawings, in which.

Figure 1:
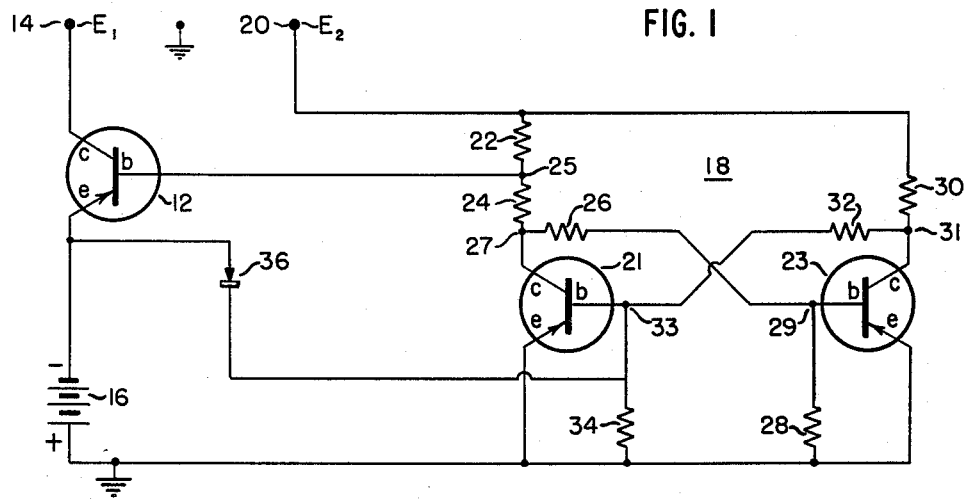
FIG. 1 illustrates a first embodiment of the invention.

With reference now to the drawings, FIG. 1 illustrates an embodiment of the invention wherein the battery charging phase is automatically terminated when the battery voltage reaches a predetermined value. The transistor 12 whose emitter, base and collector electrodes are indicated by their corresponding initials, has its collector connected to a charging terminal 14 while its emitter is connected to the negative terminal of a storage battery 16. The charging terminal 14 is coupled to a charging source $-E_1$ which may be a current or a voltage source. The transistor 12 functions as a switch between the charging source and the storage battery. Its collector-emitter junction may be rendered conductive, i.e., it may be operated at or near the collector current saturation region, by causing current flow across the base-emitter junction. When the current across the base-emitter junction is reduced to zero the collector-emitter junction becomes an infinite impedance. This is equivalent to an open circuit between the battery and the source. One way to reduce the last recited current to zero is to apply a reverse base-emitter junction polarity. Accordingly, the collector-emitter junction of the transistor 12 can be rendered conductive or non-conductive by properly controlling the potential on the base-emitter junction.

The positive terminal of the battery 16 is connected to a common junction which may, for example, be connected to ground or to any suitable reference potential. A bistable flip-flop circuit 18 includes a control terminal 20 adapted to be coupled to a source of control potential $-E_2$. The bistable flip-flop circuit further includes a pair of control transistors 21 and 23 respectively whose emitter, base and collector are again labeled with the appropriate initial. A first voltage divider comprises a series combination of resistors 22, 24, 26 and 28 connected between the control terminal 20 and the positive terminal of the storage battery. The base of the transistor 12 is connected to a junction point 25 which joints resistors 22 and 24, while the collector of transistor 21 is connected to a junction point 27 which connects transistors 24 and 26. The base of transistor 23 is connected to a junction point 29 which connects the resistors 26 and 28. The respective emitters of transistors 21 and 23 are both connected to the positive terminal of the storage battery 16. A second voltage divider comprises a series combination of resistors 30, 32 and 34 connected between the terminal 20 and the positive battery terminal. A junction point 31 couples the resistors 30 and 32 as well as the collector of the transistor 23. A junction point 33 couples the resistors 32 and 34 as well as the base of the transistor 21. A Zener diode, which has a predetermined Zener breakdown value, is connected between the negative battery terminal and the junction point 33.

The operation of the bistable transistor flip-flop circuit 18 is characteristically such that it assumes one of two possible bistable states. One of the transistors 21 and 23 is conductive across its collector-emitter junction to the exclusion of the other transistor. When the battery is charging, i.e., when the transistor 12 is conductive, the transistor 23 is normally conductive and the transistor 21 is non-conductive. In this condition, current from the source $-E_2$ flows through the second voltage divider, i.e., to the positive battery terminal via-resistors 30, 32 and 34. Because the transistor 23 is essentially saturated, the voltage across its collector-emitter junction is low and only a small amount of current flows through the resistors 32 and 34. The correspondingly small voltage drop across the resistor 34 is insufficient to cause a base-emitter junction current to flow in the transistor 21. As a result, the transistor 21 remains non-conductive, i.e., no current flows across its collector-emitter junction.

In this bistable state a first current path exists between the terminal 20 and the positive battery terminal through the first voltage divider which includes the resistors 22, 24, 26 and 28. Since the transistor 21 is not conducting current, a relatively large voltage exists across the resistor 28 which serves to maintain current flow across the base-emitter junction of the transistor 23. As such, it serves to perpetuate the conductive condition of the collector-emitter junction of the transistor 23.

A second current path exists between the terminal 20 and the positive battery terminal which includes the resistor 22, the base-emitter junction of the transistor 12 and the battery 16. The flow of current through the second current path is sufficient to maintain conduction across the collector-emitter junction of the transistor 12.

The voltage dividers which are made up of the two series resistor combinations 22, 24, 26, 28 and 30, 32, 34 respectively, are slightly unbalanced so that the transistor 23 is always rendered conductive when the voltage $-E_2$ is initially turned on. This bistable state requires the transistor 21 to be non-conductive and thus assumes that battery charging is initiated whenever the equipment is first "turned on" or recycled.

The Zener diode 36 which is connected between the negative battery terminal and the base of the transistor 21 exhibits an essentially open circuit condition (i.e., very high resistance) to current flow until the critical Zener breakdown voltage is reached. Above this voltage the Zener diode is conductive and exhibits a very low resistance to current flow. If the voltage is again lowered below the Zener breakdown potential, the diode reverts to its non-conductive state and again presents a high resistance to current flow.

The continued charging operation of the battery which draws current from the source $-E_1$ while the transistor 12 is conductive, causes the battery terminal voltage to rise. When the Zener breakdown voltage is reached a current flows abruptly from the negative battery terminal through the diode 36 and the resistor 34 to the positive battery terminal. The resultant voltage drop across the resistor 34 is applied across the emitter-base junction of the transistor 21 and is of the proper polarity to cause a current to flow across this junction. As a result of this action, the collector-emitter junction of the transistor 21 is rendered conductive and a current of relatively large amplitude flows between the terminal 20 and the positive battery terminal via the resistors 22 and 24 and across the collector-emitter junction of the transistor 21. The resistors 26 and 28 which are connected across this junction now have a very low voltage applied thereto. This action reduces the voltage applied across the base-emitter junction of the transistor 23 to a point where it is insufficient to maintain conduction across its own collector-emitter junction. The cut-off condition of the transistor 23 effects a reduction of the current flow in the resistor 30 which causes the junction point 31 to rise. This rise in potential results in an increased current flow in resistors 32 and 34. A portion of this increased current serves to increase the current flow across the emitter-base junction of the transistor 21 and thus aids in maintaining the transistor 21 in its conductive state.

The increased current which now flows through resistors 22 and 24 as a consequence of the conductive state of the collector-emitter junction of the transistor 21, produces a voltage drop across the resistor 22 of sufficient magnitude to reduce the applied voltage between the base and the emitter of the transistor 12 to zero or to actually reverse its polarity. This action reduces the current across the base-emitter junction of the transistor 12 to zero and operates to interrupt the current flow across the collector-emitter junction of the same transistor. As a result, the battery charging current which flows from the source $-E_1$ to the negative battery terminal is effectively cut off.

After the battery charging current is cut, a certain time interval elapses before the battery voltage drops to a value which is known as the idle battery terminal voltage. Where the battery supplies a load, the battery voltage will, of course, drop more rapidly. As the battery voltage falls below the critical Zener potential, the diode 36 will cease to conduct. Although the absence of the diode current tends to raise the potential applied to the base of the transistor 21, sufficient current flow is maintained through the resistors 30 and 32 to keep the base-emitter junction of transmitter 21 conductive. Accordingly, the collector-emitter junction of this transistor remains conductive.

The flip-flop circuit 18, therefore, remains in its present bistable state until it is recycled by the occurrence of an event which disrupts the proper operation of the circuit. As an example, a momentary interruption of the potential $-E_2$ which is applied to the terminal 20 may be effected. Alternatively, the base connection of the transistor 21 may be momentarily opened. As previously explained, the bistable circuit is unbalanced to an extent where the initial application of the proper operating potential results in a bistable state where the transistor 23 is conductive while the transistor 21 is cut off. Accordingly, the momentary interruption of the control potential results in the aforesaid bistable state and the switching transistor 12 again becomes conductive.

By the proper selection of the Zener diode to match the particular battery and the applied charging current, it is possible to actuate the bistable flip-flop circuit 18 as required. By employing this control system in this manner the battery charging current may be turned off whenever a specified battery voltage, which is a measure of the state of charge of the battery, is reached. It is not necessary, of course, that two separate sources $-E_1$ and $-E_2$ be used. However, where the requirements of the transistors 21 and 23 and those of the charging operation are radically different, optimum results will be obtained only when two separate sources are used.

Figure 2:
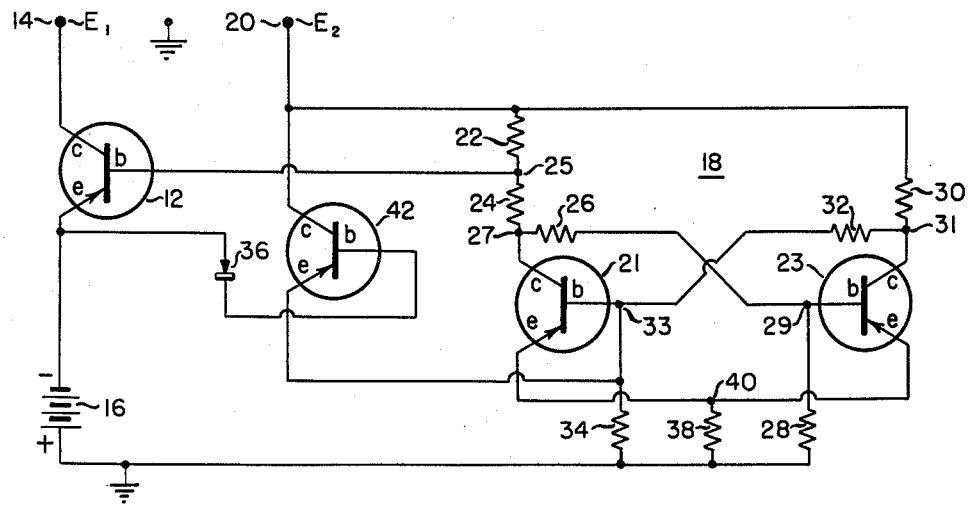
FIG. 2 illustrates a modification of the apparatus of FIG. 1 which is characterized by increased sensitivity.

FIG. 2 illustrates a modification of the apparatus of FIG. 1, applicable reference numerals having been retained. The transistors 21 and 23, as well as the Zener diode 36 are functionally equivalent to the corresponding components in the circuit of FIG. 1. The emitters of these two transistors, instead of being connected directly to the positive battery terminal, are tied to a common junction point 40 which is coupled to the aforesaid positive battery terminal by means of a resistor 38. The presence of the resistor 38 improves the stability of the bistable circuit 18 and assumes a more positive control by reverse-biasing that one of the transistors 21 and 23 which is non-conductive at the moment. A transistor amplifier 42 has its collector connected to the terminal 20, while its emitter is connected to the junction point 33. The Zener diode 36 is connected between the negative battery terminal and the base of the transistor 42. The transistor 42 serves as an amplifier of the Zener diode current, the amplified current being applied to the junction point 33. This construction permits the use of a smaller Zener diode than is possible with the apparatus of FIG. 1 since the Zener diode current is not required to actuate the flip-flop directly.

Figure 3:
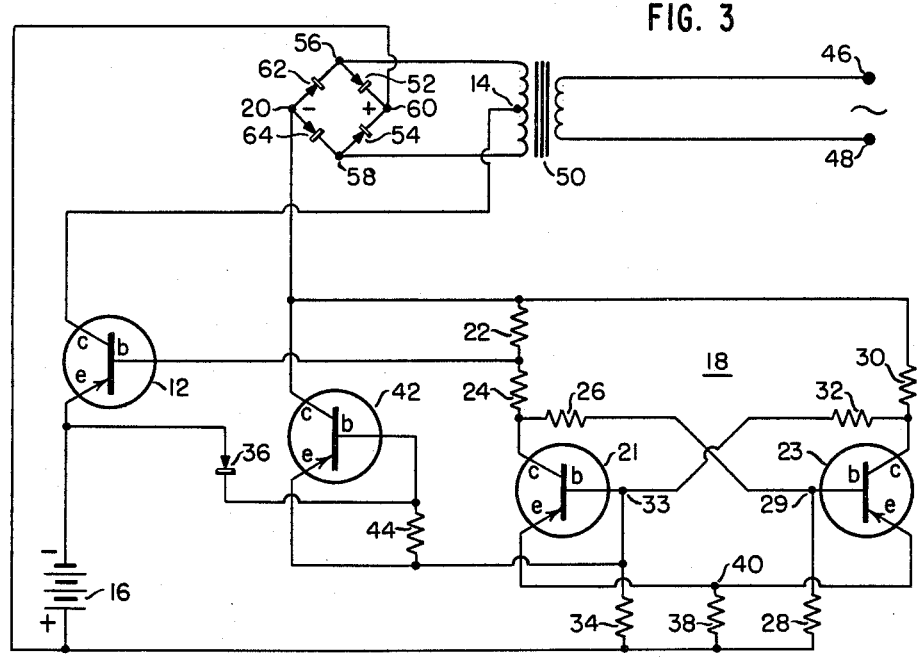
FIG. 3 illustrates a further modification of the invention which provides improved transistor operation particularly at high temperatures.

FIG. 3 illustrates a modification of the apparatus of FIG. 1, applicable reference numerals having again been carried forward. In this circuit, a resistor 44 is connected between the emitter and base of the transistor 42 in order to provide a path for any leakage currents which may occur. Where the transistor 42 is a high gain amplifier, the presence of the leakage resistor 44 is desirable in order to assure proper operation.

The apparatus of FIG. 3 further provides a way of operating the transistors 21, 23 and 24 at a higher supply voltage than is normally available from a conventional six volt battery charger. The increased supply voltage assures a higher transistor gain which results in better transistor operation. Thus, the ordinary six volt source generally consists of a pair of terminals 46 and 48 which are connected to an A.C. supply line across which the primary winding of a transformer 50 is connected. The center tap 14 of the transformer secondary is connected to the collector of the transistor 12. A pair of oppositely poled diode rectifiers 52 and 54 are connected between a junction point 60 and a pair of transformer secondary terminals 56 and 58 respectively. The available D.C. output voltage from the conventional supply circuit described so far is six volts. In order to double this voltage, a pair of oppositely poled diode rectifiers 62 and 64 is connected between the terminals 56 and 58 to form a full-wave bridge rectifier in conjunction with the diode rectifiers 52 and 54. The voltage now available at terminal 20, for application to the transistors 21, 23 and 42, is nearly double that of the standard six volt supply. Whereas the conventional supply circuit employs only one half of the transformer secondary winding, the supply circuit illustrated in FIG. 3 utilizes the full transformer secondary winding on both alternating cycles of the A.C. input which is applied to the terminals 46 and 48. By using this circuit it is possible to design the high current rectifier portion of the system for a low voltage requirement while still providing an adequate voltage to operate the transistors 21, 23 and 42 to greatest advantage.

Figure 4:
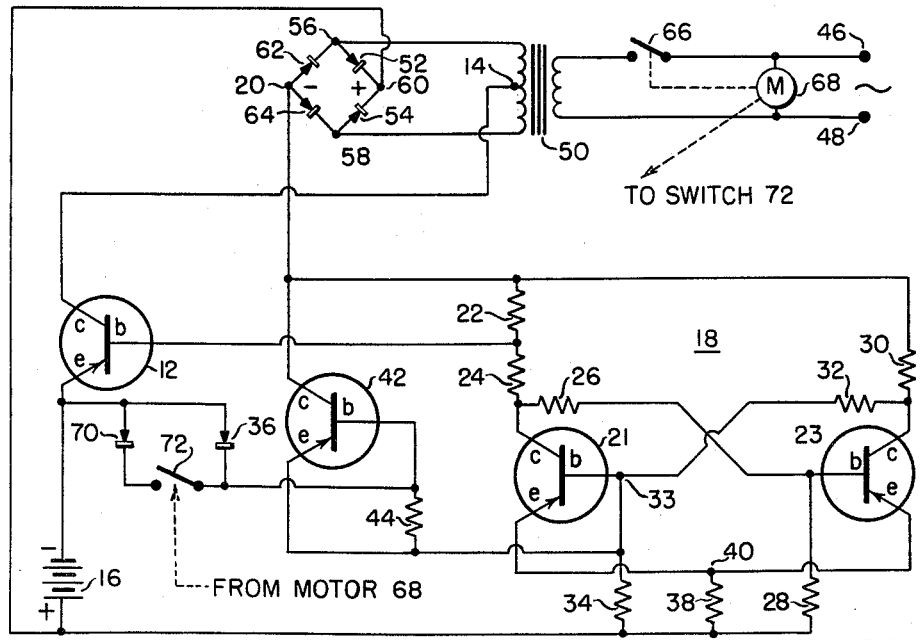
FIG. 4 illustrates a modification of the invention which is fully automatic.

The operation of the circuits which are illustrated in FIGS. 1 to 3 is semi-automatic since it provides only for the interruption of the charging current when a predetermined voltage is reached. A fully automatic embodiment of the invention is illustrated in FIG. 4, applicable reference numerals having again been retained. Here, the primary winding circuit of the transformer 50 contains a switch 66 which is connected in series with the primary winding. Additionally, a timing-motor 68 is connected to the line terminals 46 and 48. The switch 66 is seen to be mechanically coupled to the output shaft of the timing-motor 68. A second Zener diode 70, which has a lower Zener breakdown potential than the Zener diode 36, is connected in series with a switch 72. The resultant series combination is connected across the Zener diode 36. The switch 72 is mechanically coupled to the output shaft of the timing-motor 68 and is adapted to be operated by the latter. The two switches 66 and 72, although operated from the same shaft, do not have the same period of operation.

The purpose of the timer-motor controlled switches 66 and 72 is to test the state of charge of the battery 16 periodically. This operation relies on the well-known principle that the condition of the battery may be determined by measuring the rate of rise of the battery voltage while being charged. As a corollary of this principle, it may be stated that if the battery voltage reaches a stated value within a predetermined time period, the battery is fully charged.

If it be assumed that the storage battery 16 is fully charged, then the transistors 12 and 23 are cut off while the transistor 21 is conductive, as explained in connection with the circuit of FIG. 1. The battery charging current is cut off and no current flows in the Zener diodes. The timer-motor 68, which operates from the A.C. line, momentarily opens and closes the switch 66. In accordance with the operation outlined in connection with the apparatus of FIG. 1, the unbalance of the bistable flip-flop circuit causes the transistor 23 to become conductive while transistor 21 is cut off. As a result, the switching transistor 12 also becomes conductive and permits a charging current to flow to the battery. At this time, the switch 72 is closed by the timer-motor 68 and remains closed for a predetermined time interval. During the period when the switch 72 is closed the Zener diode 70, which has a lower breakdown potential than the Zener diode 36, is connected across the latter diode. If the battery is substantially charged, the battery voltage will rise to the Zener breakdown potential of the diode 70 within the time period during which the timing-motor 68 maintains the switch 72 in its closed position. The Zener diode 70 conducts with the result that flip-flop circuit 18 assumes its other bistable state where the transistor 23 is cut off and the transistor 21 is conductive. As a further consequence of this action the switching transistor 12 becomes non-conductive and the flow of charging current to the battery is cut off. At such time as the Zener diode 70 eventually reopens, no further action results as described in connection with the apparatus of FIG. 1.

If, at the time that the switch 72 is closed, the battery 16 is not fully charged, the battery voltage will not rise at sufficiently rapid rate to reach the Zener breakdown potential of the Zener diode 70. Consequently the charging must continue until the relatively higher breakdown point of the Zener diode 36 is reached. When this point is reached the conduction in the Zener diode 36 renders the transistor 23 and 12 non-conductive, while the transistor 21 is caused to conduct, as described in connection with the apparatus of FIG. 1.

The invention herein is not limited to the preferred embodiments which are illustrated and described above. For example, each of the circuits of FIGS. 1 to 3 may be adapted to incorporate the fully automatic operation described in connection with the apparatus of FIG. 4. Further, although pnp-type transistors have been illustrated in the drawings, it will be understood that npn-type transistors could also be employed. In the latter case it is necessary to reverse all the polarities, including those of the Zener diodes.

In general, the transistor 12 consists of a high-current power transistor, or of a plurality of high-current power transistors which are connected in parallel. The number of transistors employed and their size depends entirely on the charging current and voltage requirements. The control transistors 21, 23 and 42 may, however, be low-power types since they are not required to handle large currents.

The combination of a sensing element and of a control element in the form of a Zener diode and of a bistable transistor flip-flop circuit respectively, has a great many advantages. Since the battery voltage changes relatively slowly as it nears the end of a normal recharging cycle, a positively acting device is required in order to insure reliable operation. This positive action is supplied by the operation of the transistor flip-flop circuit which can exist in only of two bistable states. It becomes particularly important when it is considered that even Zener diodes have a small transitional region. The positive action of the bistable flip-flop circuit assures reliable operation in this twilight area.

In general, the terminal voltage of most storage batteries varies with the ambient temperature and the charging device must be compensated for this effect. Zener diodes also exhibit temperature coefficients which may change the Zener breakdown voltage within a limited range. By the proper selection of the Zener diode for a temperature coefficient which matches the temperature sensitive battery requirements, a battery charging control circuit can generally be constructed which is relatively insensitive to ambient temperature changes. In certain instances, however, more than one Zener diode may be required in order to retain the proper match and a series-connected group of low-voltage Zener diodes may be used in place of the single unit illustrated in FIGS. 1 through 4.

From the foregoing disclosure it will be apparent that numerous modifications, variations and equivalents will now occur to those skilled in the art all of which fall within the true spirit and scope of this invention.

I claim:

1. Control apparatus for charging a storage battery from a source, comprising a switching transistor having its collector-emitter junction connected between said source and the negative terminal of said storage battery, a bistable circuit comprising a terminal adapted to have a control voltage applied thereto, first and second resistors connected in series to said control voltage terminal, the base of said switching transistors being connected to the junction point of said first and second resistors, a third resistor connected to said control voltage terminal, first and second control transistors having respective emitters thereof connected to the positive terminal of said storage battery, respective collectors of said control transistors being connected to said second and third resistors respectively, the base of each of said control transistors being resistively coupled to the collector of the other control transistor, the base of each of said control transistors being further resistively coupled to said positive battery terminal, a Zener diode connected between the negative battery terminal and the base of said second control transistor, said bistable circuit being unbalanced to render said first control transistor conductive and to cut off said second control transistor whenever said control voltage is momentarily interrupted.

2. Control apparatus for charging a storage battery from a source, comprising a switching transistor having its collector-emitter junction connected between said source and the negative terminal of said storage battery, a bistable circuit comprising a terminal adapted to have a control voltage applied thereto, first and second resistors connected in series to said control voltage terminal, the base of said switching transistors being connected to the junction point of said first and second resistors, a third resistor connected to said control voltage terminal, first and second control transistors having respective emitters thereof connected to a common junction point, said last recited junction point being resistively coupled to the positive terminal of said storage battery, respective collectors of said control transistors being connected to said second and third resistors respectively, the base of each of said control transistors being resistively coupled to the collector of the other control transistor, the base of each of said control transistors being further resistively coupled to said positive battery terminal, a third control transistor having its emitter-collector junction connected between said control voltage terminal and the base of said second control transistor, a Zener diode connected between the negative battery terminal and the base of said third control transistor, said bistable circuit being unbalanced to render said first control transistor conductive and to cut off said second control transistor whenever said control voltage is momentarily interrupted.

3. The apparatus of claim 2 and further comprising means for resistively coupling together the base and emitter of said third control transistor.

4. The apparatus of claim 3 and further comprising a full-wave bridge rectifier having first and second pairs of opposite terminals, an A.C. supply, said first pair of terminals being coupled to said A.C. supply by means of a transformer, said control voltage terminal constituting one of the terminals of said second terminal pair, the other terminal of said second terminal pair being connected to the positive battery terminal.

5. The apparatus of claim 4 wherein the collector of said switching transistor is coupled to the center tap of the secondary winding of said transformer.

6. The apparatus of claim 5 and further comprising a timer-motor connected across said A.C. supply, a first switch in series with the primary winding of said transformer, a second Zener diode in series combination with a second switch, said series combination being connected in parallel with said first Zener diode, said second Zener diode having a lower Zener breakdown potential than said first Zener diode, said first and second switches being adapted to be periodically closed by said timer-motor for unequal periods.

7. Control apparatus for charging a storage battery to a predetermined voltage from a source comprising, transistor switching means adapted to connect the battery to the source, means adapted to provide an abrupt impedance change when the battery voltage passes the predetermined voltage independently of the voltage value of the source, said last-mentioned means being connected to said transistor switching means and adapted to be connected to the battery, and a bistable circuit responsive to the impedance of said last-mentioned means to operate said transistor switching means to break the circuit from the source to the battery when the battery voltage passes the predetermined voltage.

8. The apparatus of claim 7, further comprising means for applying a reference voltage to said bistable circuit, said bistable circuit being responsive to an interruption of said reference voltage to operate said transistor switching means to complete the circuit from the source to the battery.

9. The apparatus of claim 8, further comprising means for periodically interrupting the application of said reference voltage to said bistable circuit.

References Cited in the file of this patent
UNITED STATES PATENTS
2,776,382    Jensen _____ Jan. 1, 1957